(12) United States Patent
Templeton

(10) Patent No.: US 8,352,367 B2
(45) Date of Patent: Jan. 8, 2013

(54) SYSTEM AND METHOD FOR FACILITATING LARGE SCALE PAYMENT TRANSACTIONS

(75) Inventor: Randy J. Templeton, Sugarland, TX (US)

(73) Assignee: PreCash, Inc., Houston, TX (US)

( * ) Notice: Subject to any disclaimer, the term of this patent is extended or adjusted under 35 U.S.C. 154(b) by 0 days.

(21) Appl. No.: 13/506,984

(22) Filed: May 30, 2012

(65) Prior Publication Data

US 2012/0296813 A1 Nov. 22, 2012

Related U.S. Application Data

(60) Division of application No. 13/135,175, filed on Jun. 28, 2011, now Pat. No. 8,234,214, which is a continuation-in-part of application No. 11/709,063, filed on Feb. 21, 2007, which is a continuation-in-part of application No. 11/026,471, filed on Dec. 30, 2004.

(60) Provisional application No. 60/534,752, filed on Jan. 7, 2004.

(51) Int. Cl.
   *G06Q 40/00* (2012.01)

(52) U.S. Cl. ............... 705/40; 705/38; 705/39

(58) Field of Classification Search ............... 705/38–39
   See application file for complete search history.

(56) References Cited

U.S. PATENT DOCUMENTS

| 6,292,789 | B1 * | 9/2001 | Schutzer | 705/40 |
| 6,408,284 | B1 * | 6/2002 | Hilt et al. | 705/40 |
| 7,752,095 | B1 * | 7/2010 | Laracey et al. | 705/34 |
| 7,890,419 | B2 * | 2/2011 | Jung et al. | 705/38 |
| 2001/0025257 | A1 * | 9/2001 | Sato | 705/26 |
| 2002/0073022 | A1 * | 6/2002 | Wisecarver et al. | 705/38 |
| 2003/0191711 | A1 * | 10/2003 | Jamison et al. | 705/40 |
| 2005/0010523 | A1 * | 1/2005 | Myklebust et al. | 705/40 |
| 2009/0070246 | A1 * | 3/2009 | Tieken | 705/35 |

FOREIGN PATENT DOCUMENTS

WO WO 9522113 A1 * 8/1995

OTHER PUBLICATIONS

Claims Submission Leads Electronic Advances Moynihan, James J; Norman, Kathryn C. Healthcare Financial Management 46. 6 (Jun. 1992).*

* cited by examiner

*Primary Examiner* — William Rankins
(74) *Attorney, Agent, or Firm* — Sue Z. Shaper

(57) ABSTRACT

A system and method of payment of an end-user account with a service provider includes a computer system that makes payments to service providers on behalf of end-users and that is operable to exchange information with a terminal at the point of sale or a web-enabled computer system operated by the end-user and with the computer system of the service provider. In one embodiment, the computer system of an intermediary receives and fulfills a request to make a payment on an end user's account with a service provider. In another preferred embodiment, a payment router together with an issuing/sponsoring bank and a processor, as implemented by their computer systems, facilitate payment transactions in which the router transacts at least thousands of payments for at least hundreds of payors with at least dozens of payees using at least one open system card association network, preferably in a day.

4 Claims, 15 Drawing Sheets

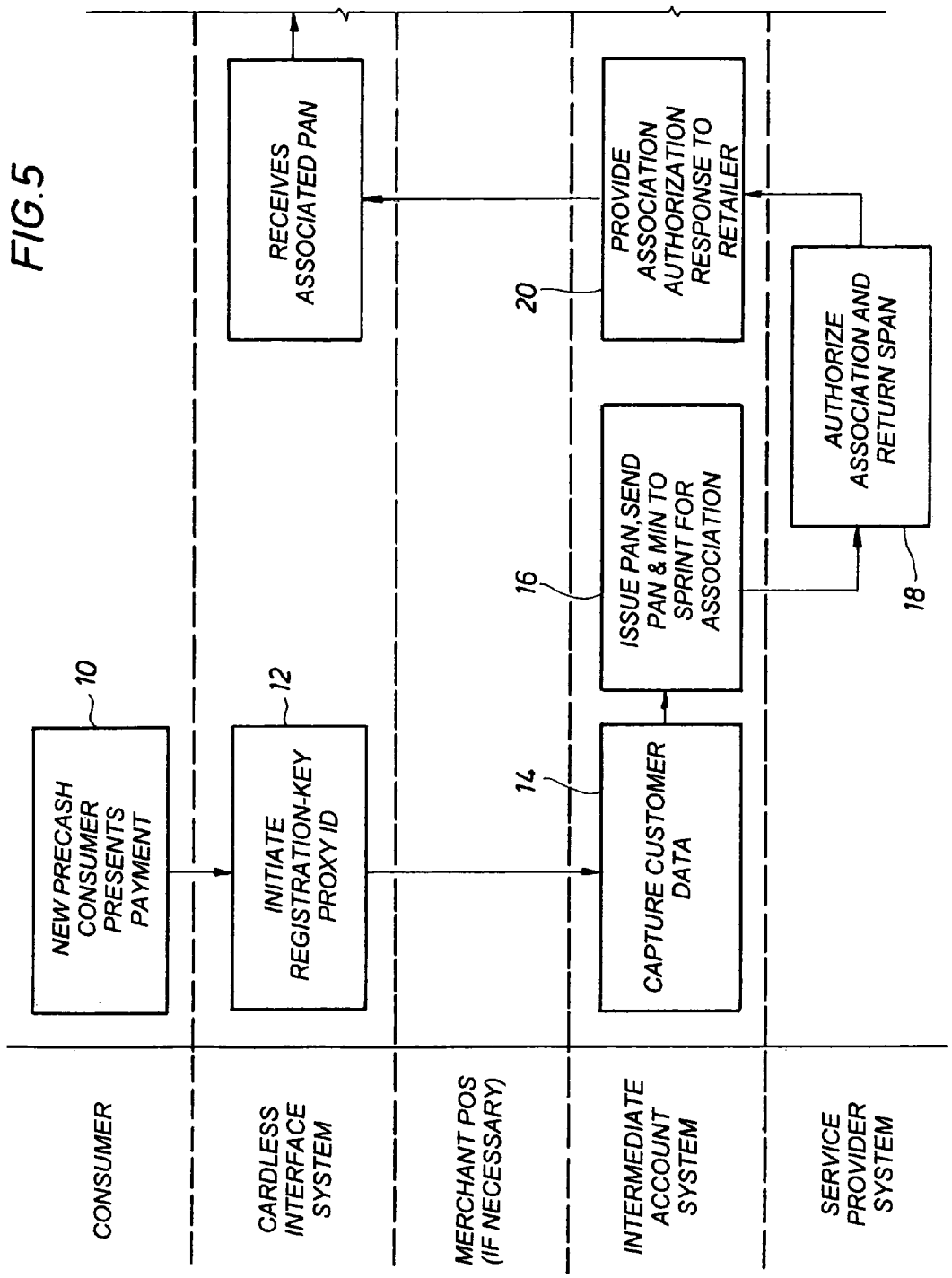

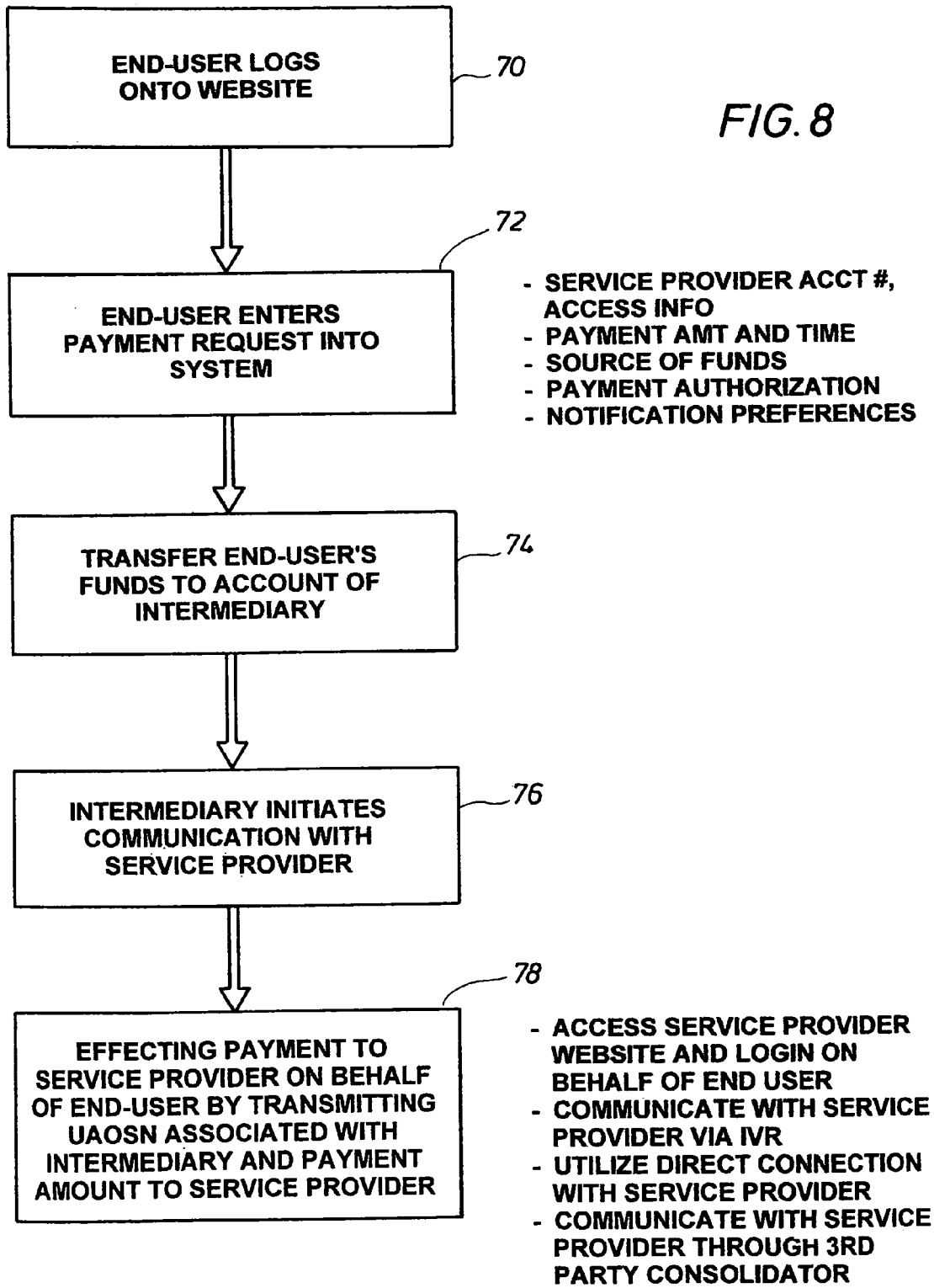

FIG. 9

DESCRIBE THE MAIN PURPOSE OF THE PROGRAM (THIS SHOULD BE THE SUMMARY OF INFORMATION COLLECTED IN OTHER SECTIONS)

PRECASH r INDIRECT PAYMENTS POST-PAYMENT SOLUTION

PRECASH SEEKS TO PROVIDE THE ADVANTAGES OF ACCESS TO SAME-DAY OR NEAR SAME-DAY BILL PAYMENT OPTIONS. THESE PAYMENTS ARE EXPEDITED BY DELIVERING THE PAYMENT TO THE MERCHANT'S EXISTING CARD-ENABLED PAYMENT CHANNELS (WEB OR IVR) UTILIZING A COMMERCIAL, SINGLE-USE VIRTUAL VISA ACCOUNT NUMBER.

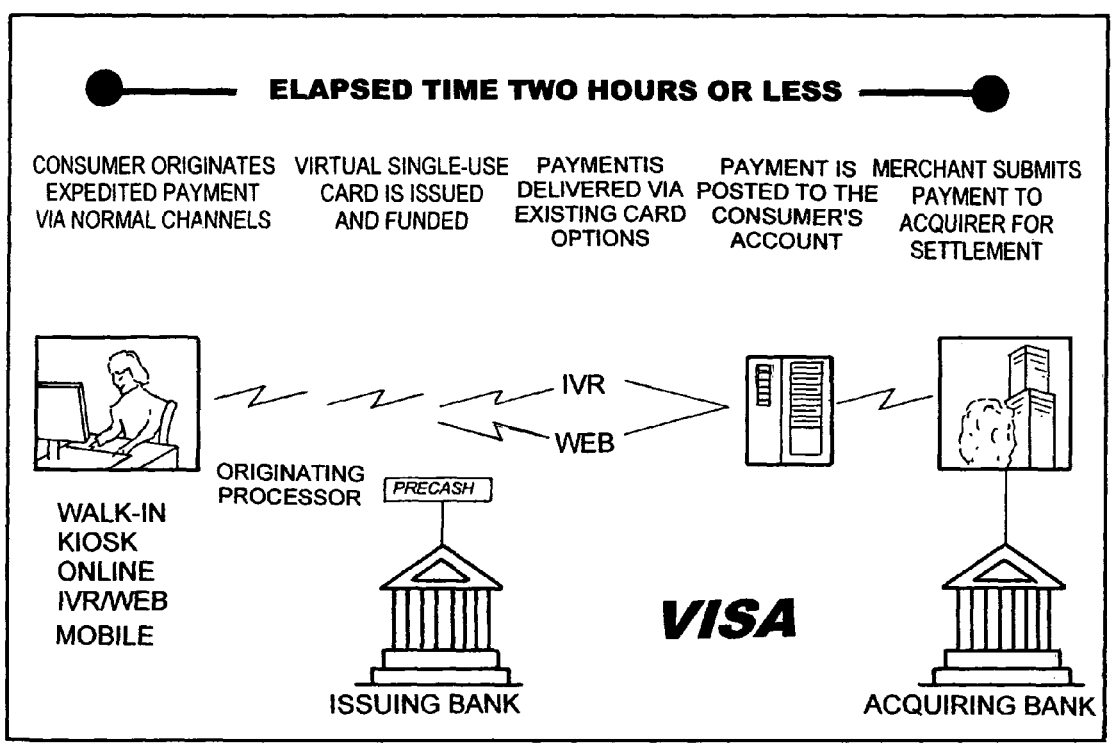

PAYMENTS PROCESSED BY PRECASH THROUGH THIS METHOD MAY ORIGINATE THROUGH ANY BILL PAYMENT CHANNEL, INCLUDING, BUT NOT LIMITED TO : IN-PERSON (BILLER BUSINESS/COMMUNITY OFFICE , 3 RD PARTY W/PP, DROP-BOX, KIOSK, FIELD REP), ONLINE/INTERNET (BILLER WEBSITES, FINANCIAL INSTITUTION WEBSITES,3 RD PARTY WEBSITES, DESKTOP/PVC-MONEY MANAGEMENT SOFTWARE), PHONE (IVR, CSR), MOBILE (PREMIUM SMS BASED TRANSACTIONAL PAYMENTS, DIRECT MOBILE BILLING, MOBILE WEB PAYMENTS (WAP), CONTACTLESS NFC (NEAR FIELD COMMUNICATION), MAIL-IN, AND PAYMENT CONSOLIDATORS/AGGREGATORS.

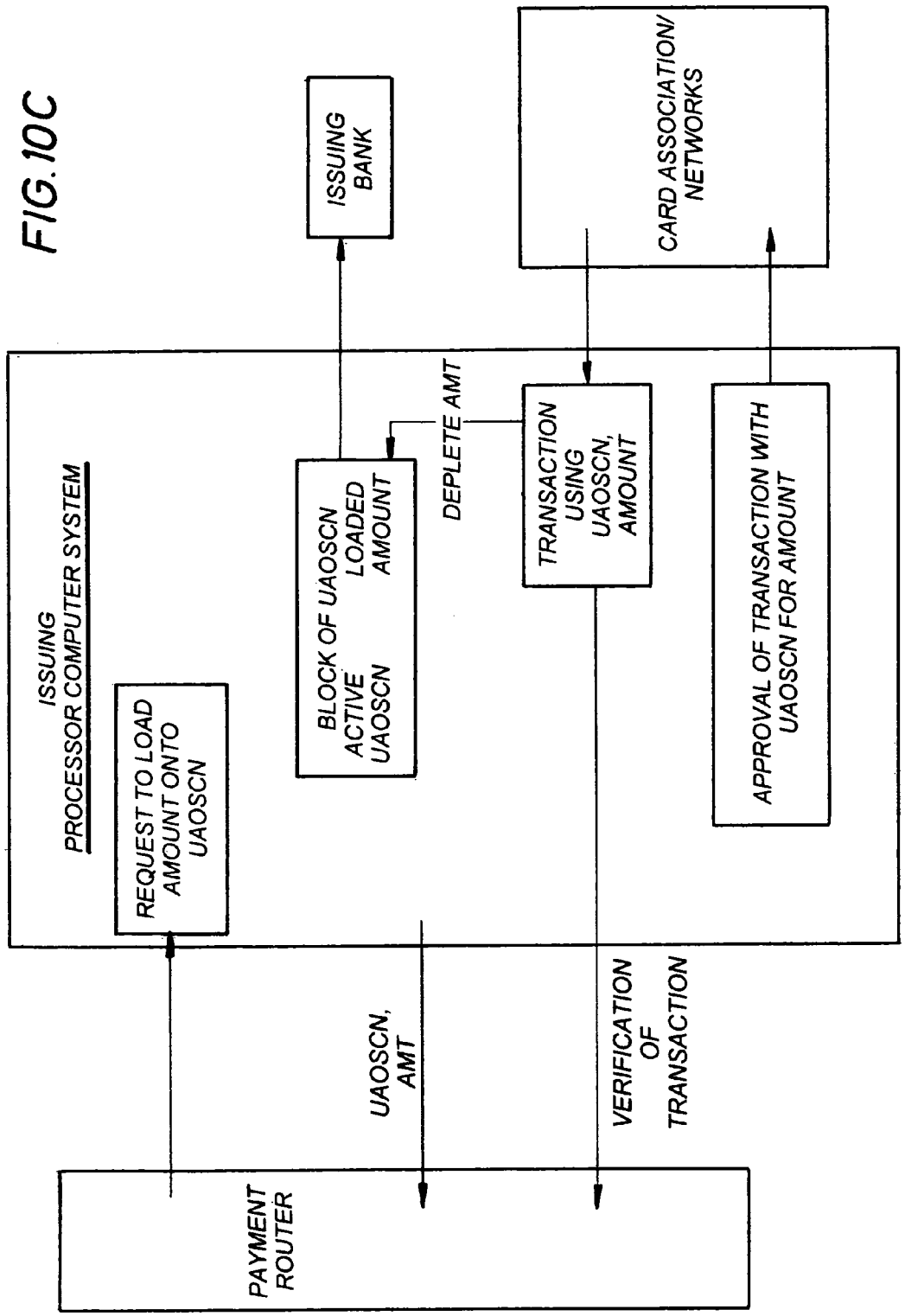

SYSTEM AND METHOD FOR FACILITATING LARGE SCALE PAYMENT TRANSACTIONS

CROSS REFERENCE TO RELATED APPLICATIONS

This patent application is a divisional application of, and claims priority to, co-pending parent application Ser. No. 13/135,175, having the same inventor, of the same title, and filed Jun. 28, 2011, which parent application is a continuation-in-part of, and claims priority upon, U.S. patent application Ser. No. 11/709,063, entitled "System and Method for Facilitating Payment Transactions," inventor Randy Templeton, filed Feb. 21, 2007, claiming priority in turn upon U.S. application Ser. No. 11/026,471, entitled "System and Method for Simplifying Processes Related to Payment Opportunities," filed on Dec. 30, 2004, which claims the benefit of U.S. Provisional Application No. 60/534,752, filed on Jan. 7, 2004.

FIELD OF THE INVENTION

This invention relates generally to payment transactions, and, more particularly, to a system and method useful for simplifying processes related to payment opportunities.

BACKGROUND OF THE INVENTION

Payment cards may be used in a number of different applications. These cards may be used, for example, in both prepay and post-pay applications and other subscription based services. Post-pay cards may be used to pay for goods or services that have already been used or received. For example, a consumer may pay their AT&T telephone bill at the end of the month using a post-pay card.

Typically, the post-pay card is presented at a merchant's point-of-sale along with a payment. An identifier on the card (e.g., an account number embossed on the card or magnetic stripe) allows the merchant to accurately submit the consumer's account number and have the payment credited to the consumer's account via an electronic payment system.

Prepaid cards may be used to prepay for a number of goods and services. These cards generally include an identifier, such as a card number, that is unique to the card. Traditionally, an end-user purchases a prepaid card for a certain good or service (e.g., long distance telephone service, wireless service, retail shopping, etc.), and then redeems the stored value at a later time for the particular good or service.

Other prepaid card systems allow the end-user to activate an account that is associated with the prepaid card. This is typically done by associating the prepaid card number or other identifier with an end-user account number. The account number is usually the same number embossed on the card. The end-user account may be, for example, a wireless phone account.

With this approach, the end-user stores value on the end-user's account and the end-user account is decremented when the end-user actually purchases or uses the particular good or service. The end-user is able to recharge the account by providing a payment at certain points-of-sale, such as convenience stores, kiosks, and the like. Once a payment is provided, the account is recharged in an amount usually equal to the payment minus a service charge or other associated fee. This may be accomplished, for example, using the existing banking network. When the card is swiped, the transaction may be routed to the appropriate destination.

Conventional payment card transactions require the cardholder to present their payment card to, for example, a merchant at the time of use. Consumers that have lost or forgotten their payment cards are generally unable to redeem the value and/or service associated with the payment card, at least without taking some additional action with the card issuer or service provider. Moreover, a consumer may be required to carry multiple payment cards. For example, a consumer may carry a debit card, prepaid phone card, recharge card, etc. The multiple card problem is shared by merchants who distribute these various payment cards. Ordinarily, merchants stock, and make available, a variety of different payments cards. These cards are often placed on display at the merchant location, thus taking up valuable sales space and increasing the possibility for theft.

Service providers, such as telecommunication providers, long distance carriers, dish television providers, and the like are often required to make significant modifications to there existing financial infrastructure to accommodate the electronic mechanisms that go along with processing payment card transactions. These modifications are often costly and time consuming for the service provider.

The present invention is directed to overcoming, or at least reducing the effects of, one or more of the problems set forth above.

Certain preferred embodiments of the present invention are also directed toward large scale commercial payment routers, overcoming the problem of providing large scale expedited payments for a variety billers or payees to a variety of payors without having to integrate the payment router with the billers or payees in a closed loop, and while still providing expedited or largely same day payment of accounts. Instant preferred embodiments of the invention further creates a new paradigm for funding the costs of providing payment services.

SUMMARY OF THE INVENTION

In one aspect of the invention, a method of payment is provided. The method includes offering, at a first location, a cardless payment option to at least one consumer. A proxy ID is accepted from the at least one consumer. The proxy ID is entered into a cardless interface system and communicated to a second location that is remote from the first location. Customer data, associated with the proxy ID, is received at the first location. The customer data includes at least one account number. A payment is accepted from the consumer, and an electronic record is communicated to the second location that is representative of the payment of the account number. A confirmation is received that at least a portion of the payment has been associated with the account number.

In another aspect of the invention, the present invention provides a system and method capable of facilitating electronic payment(s) to one or more service providers on behalf of an end-user. The present invention provides one or more computer systems capable of operating in conjunction with one or more computer terminals and service provider systems via one or more computer networks in order to provide the end-user with a convenient and efficient manner of making payments.

The computer system of the present invention is capable of receiving payment request(s) via a computer network from a terminal operated by the end-user or from a remote computer system connected to an internet website provided by the system. In one embodiment, payment requests entered by the end-user provide the system with information such as the end-user's account number with a service provider, the amount of the requested payment, and an approval or authorization for payment(s) to be made on the end-user's behalf. In one embodiment, the payment request may also include an identification of the end-user's source of funds to be used to make one or more payments as well as instructions regarding where and when to make such payments.

Once the payment request is received by the computer system of the present invention, the system transmits a universally accepted open system number and the payment amount indicated from the end user to the computer system of the service provider to effect payment on the end-user's account with the service provider. In one embodiment, the computer system signs on to the service provider's payment web page, logs in on behalf of the end-user, and enters the universally accepted open system number and the payment amount received from the end-user to effect payment on the end-user's account to the service provider. In one embodiment, the universally accepted open system number is a credit card or other means of payment owned by an intermediary associated with the computer system of the present invention.

In certain preferred embodiments the invention involves system and method wherein a large scale payment router, coordinated with an issuing or sponsoring bank and its processor, can perform expedited payments for hundreds of payors with at least dozens of payees. In one day the payment router can transact thousands of payments using thousands of UAOSCN issued to it to effect expedited payments using over system card association networks. Key players include an issuing/sponsoring bank that sponsors and authorizes the issuance of a plurality of universally accepted open system card numbers to be issued to one payment router, and a processor for an issuing/sponsoring bank that will receive and honor in a day thousands of requests to create and fund UAOSCN to be used by a payment router.

BRIEF DESCRIPTION OF THE DRAWINGS

The invention may be best understood by reference to the following description taken in conjunction with the accompanying drawings, in which like reference numerals identify like elements, and in which:

FIG. 2 is another illustrative screen shot from the system shown in FIG. 1;

FIG. 4 is yet another illustrative screen shot from the system shown in FIG. 1;

FIG. 8 is a process flow diagram of the value transfer process of one embodiment of the present invention.

FIG. 9 illustrates a program for large scale expedited payment routing in a summary objective drawing.

FIGS. 10A-C illustrate embodiments of computer systems of an issuing bank, a payment router and a processor.

Figure 1:
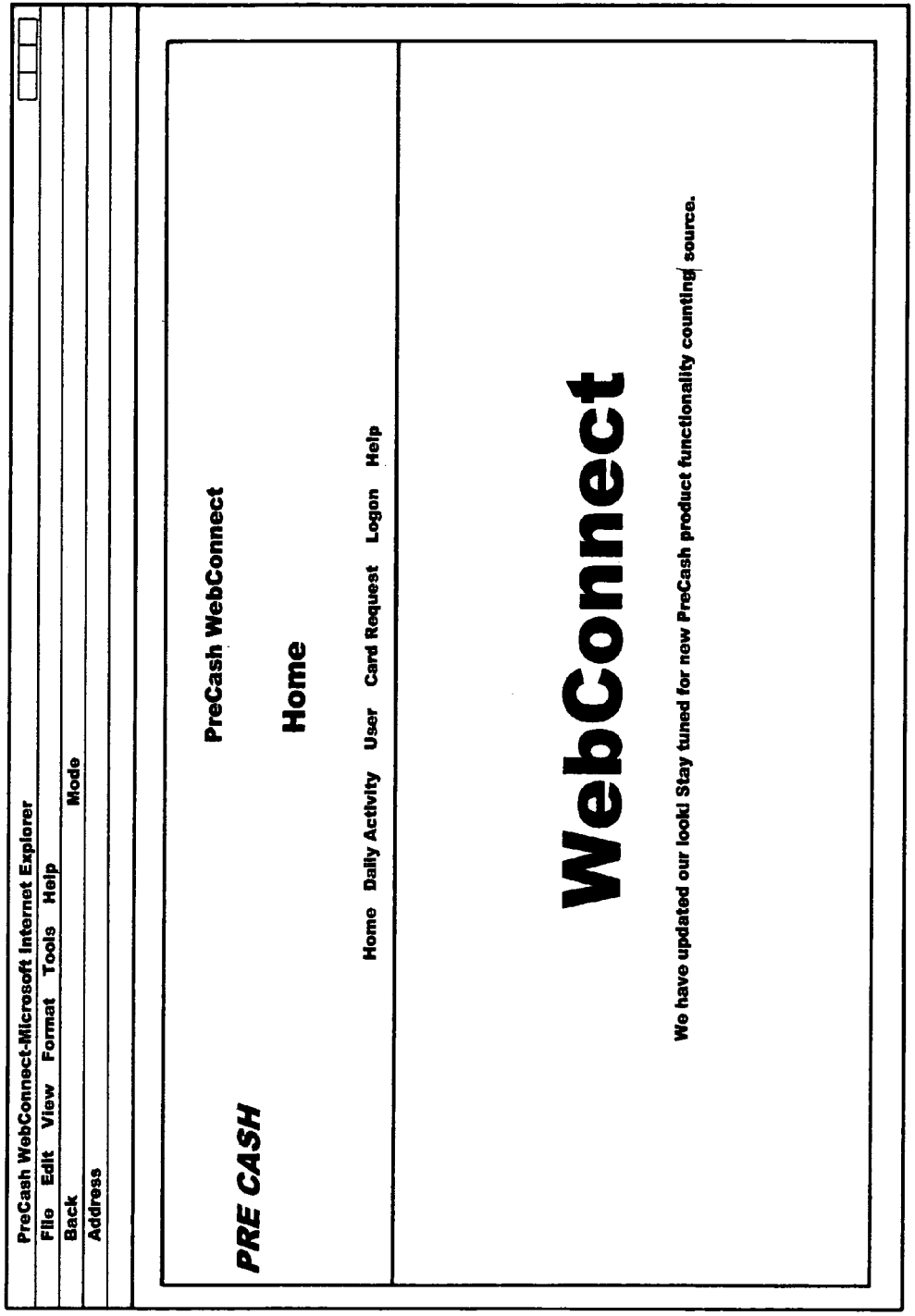
FIG. 1 is a screen shot from an illustrative system for delivering an instant issued payment card number.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

When a payment card is used, depending upon the payment card and system configuration, information may be routed to a number of different locations. For example, with a post-pay transaction, payment information may routed to the provider of the goods or services. For example, a consumer may present a payment card at kiosk to pay their AT&T bill. During this transaction, payment information may be routed to AT&Ts billing system and the consumer's account credited accordingly.

In another example, the payment card may be associated with an intermediary account. In one embodiment, the identifier on the payment card (e.g., the card number) is the intermediary account number. The intermediary account may be associated with an end-user account maintained by a retailer or service provider. Such a system is described, for example, in U.S. Pat. No. 6,185,545 B1, the disclosure of which is hereby incorporated by reference. One example of such a system is the payment system offered by PreCash Inc. ('PreCash'). It should be appreciated, however, that other card issuers may implement similar systems or incorporate various aspects of an intermediary account type infrastructure. Moreover, reference in the following Figures to PreCash should not be interpreted as limiting the present invention to just PreCash systems and/or PreCash process flows.

If a payment is made, for example, at a point-of-sale, the transaction is routed to the end-user account via the association between the end-user account and intermediary account. This may be accomplished, in one illustrative embodiment, using the existing banking network. Using an intermediary account, the association between the intermediary account and the end-user account may be changed without requiring additional modifications to the payment card or other aspects of the system.

The following describe a number of systems and methods that may be used separately or in conjunction with the various payment systems and other systems as well. It should be appreciated that these systems may be used with or without an intermediary account and that the details of particular embodiment may vary depending upon the application. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Card-Less Transaction at Point-of-Sale (POS)

Ordinarily, non-personalized payment cards (e.g., prepay, post-pay, etc.) encoded with individual card numbers (e.g., end-user account numbers, intermediary account numbers, etc.), are sent in bulk to retail merchants who provide them to consumers in order for a payment transaction to be processed.

As previously described, the payment transaction may include a recharge transaction or payment transaction.

Consumers (i.e., end-users) using these cards are usually either new payment card customers or existing payment card customers who have lost or forgotten their card. In traditional card systems, the card is necessary so that the account number may be entered when a transaction is processed. Today, if a retailer runs out of cards the retailer is unable to process transactions for consumers who do not already have a card in their possession.

It would be desirable to provide merchants with the ability to get an instant issued payment card number to facilitate processing of any transaction. This would reduce or eliminate the need to maintain in-store card inventory.

In one embodiment, the retailer requests from a payment card vendor, such as PreCash, a card number via the web, a separate POS terminal, or via their integrated POS register system. This instant issued number can immediately be used to process a transaction, such as a recharge payment, payment transaction, etc.

When used with an intermediary account, as an optional feature, the merchant requesting the card number may also input the consumer's end-user account number, and have the end-user account number automatically associated with the newly issued card number (i.e., the intermediary account number.)

As an additional option, the merchant may input an amount of the payment the consumer wishes to make at the time of the card number request. With the intermediary account example, the card number may be associated with the end-user account, and the payment may be applied as part of the same transaction.

As yet another option, the merchant may input the consumer's name and address for a card vendor to mail to the consumer a personalized or non-personalized reusable card for subsequent payments. These steps may all be combined into a single step or performed separately.

Referring to FIG. 1, a screen shot of an illustrative system call "WebConnect" is shown. With this illustrative system, a consumer may be issued an instant card number via the Internet. A merchant, for example, may access such a system via a terminal, personal computer, or any other web-connected electronic device installed at the merchant location. It should be appreciated, however, that such a system may be configured so that other users, such as consumers, kiosk operators, service providers, are also permitted access. Continuing with the illustrative transaction, the merchant may access this screen by entering the appropriate URL address. Depending upon the particular configuration, access to the system may also be password protected.

Figure 2:
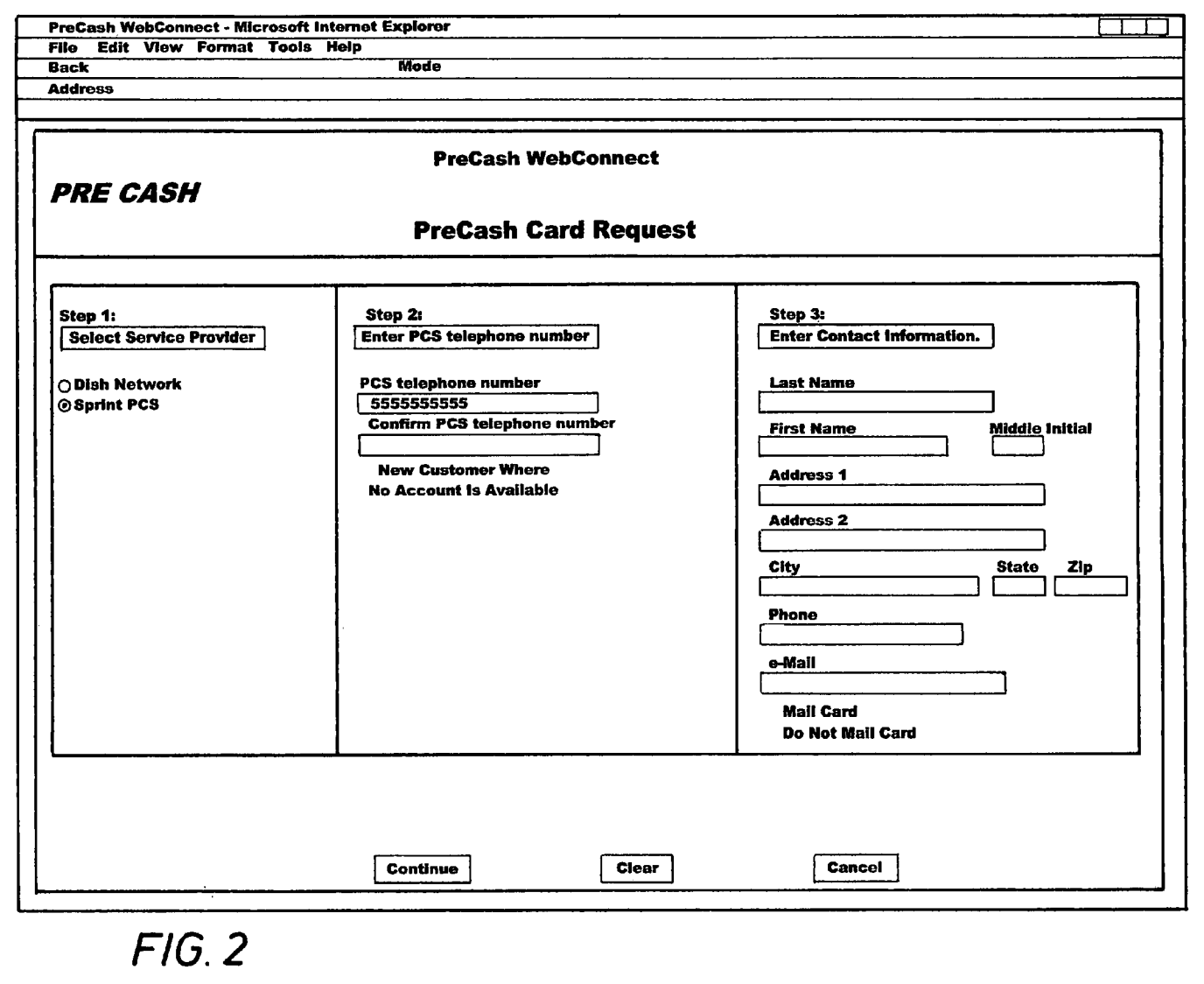

From the main menu, if an instant card number is to be issued, the merchant may select the "Card Request" option. Referring to FIG. 2, an illustrative "Card Request" screen is shown. Continuing with this example, in step 1, the web based interface allows the merchant to select a service provider, such as Dish Network, Sprint PCS, etc. In step 2, an account number of the selected service provider is entered. For example, depending upon the selected service provider, the consumers telephone number or Dish Network account number is entered. In step 3, the consumer's contact information is entered.

Figure 3:
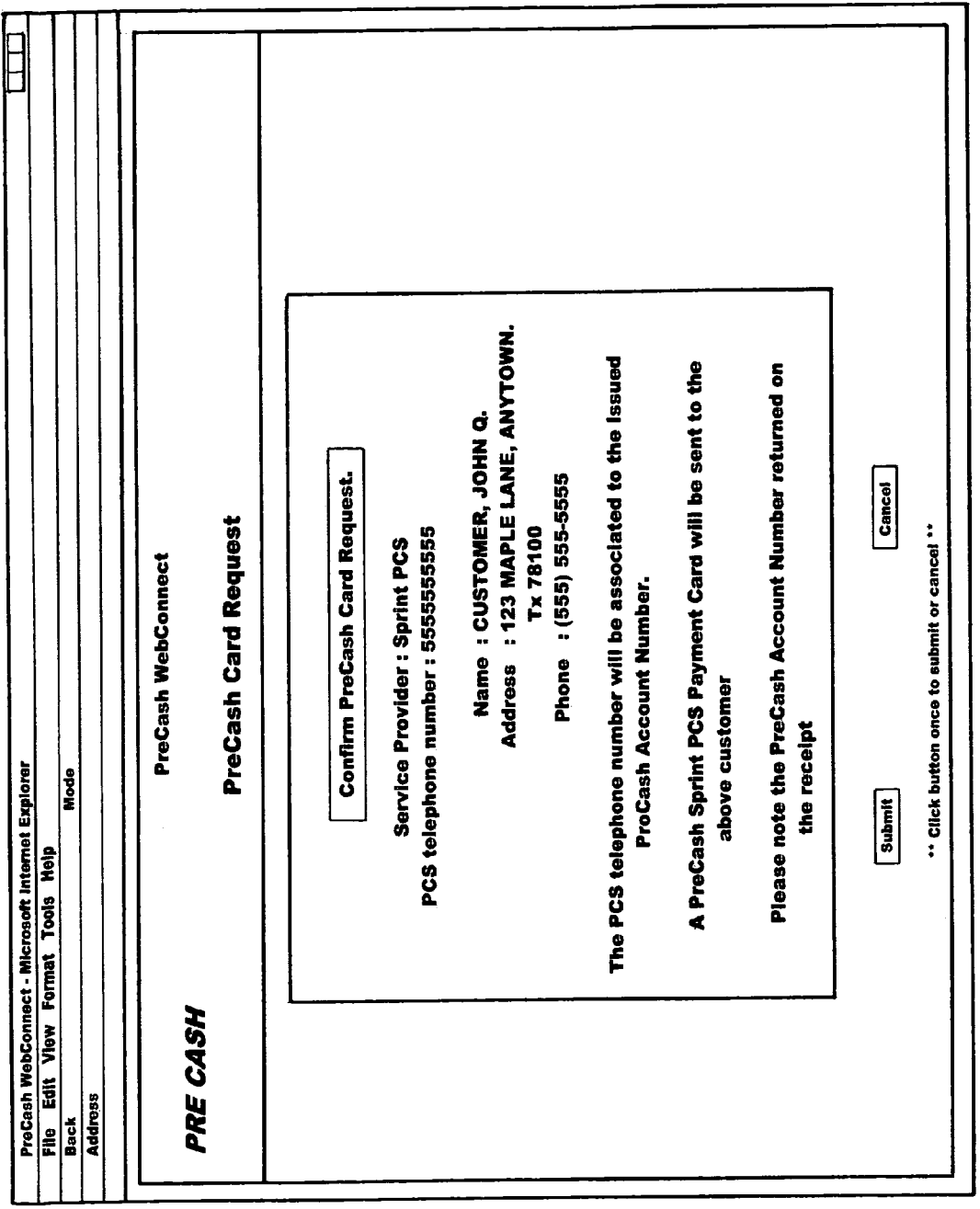
FIG. 3 is another illustrative screen shot from the system shown in FIG. 1.

Once the information is entered and after selecting the "Continue" button, the system may be configured to allow for confirmation of the entered information. FIG. 3, for example, illustrates an exemplary confirmation screen that may be presented to the user before the information is submitted. This optional confirmation step allows the merchant and/or consumer to verify that the information entered is correct. If it is not, the user may return to previous screens and reenter the information.

Figure 4:
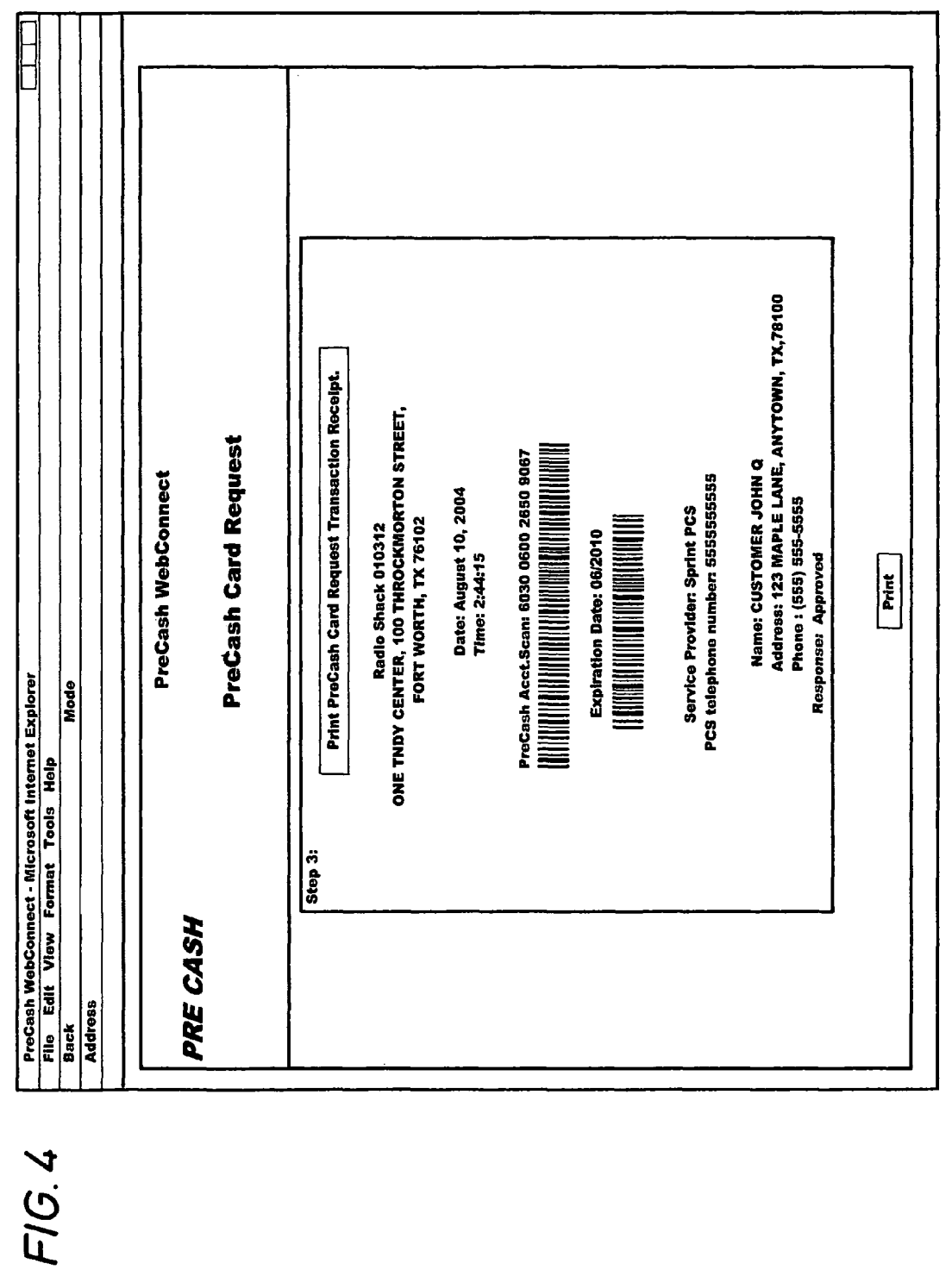

Referring to FIG. 4, once the consumer's information is submitted, a transaction receipt and instant issued account number appear on the screen. In this example, the account number is an intermediary account number (e.g., PreCash account number) that has been associated with the consumer's service provider account number (e.g., Dish Network account number, Sprint PCS phone number, etc.). For added convenience, a bar code may be returned on the screen that may be scanned, for example, by a merchant to more easily facilitate a payment transaction. For example, if the consumer wishes to make a payment (e.g., recharge transaction), the merchant may scan the bar code and/or type in the intermediary account number into the POS and enter the amount of the payment received from the consumer. At a kiosk, the consumer may initiate the payment by entering cash or other form of payment into the machine.

A similar system could also allow for a pure cardless transaction. In other words, rather than having the consumer present a physical card to facilitate a transaction, a cardless lookup of the consumer's information could be accomplished using a proxy ID, such as the consumer's telephone number and date of birth, Dish Account Number, social security number, registration ID, service provider account number, etc. The proxy ID could be used as part of a new customer cardless process and for making subsequent cardless payments.

Figure 5:
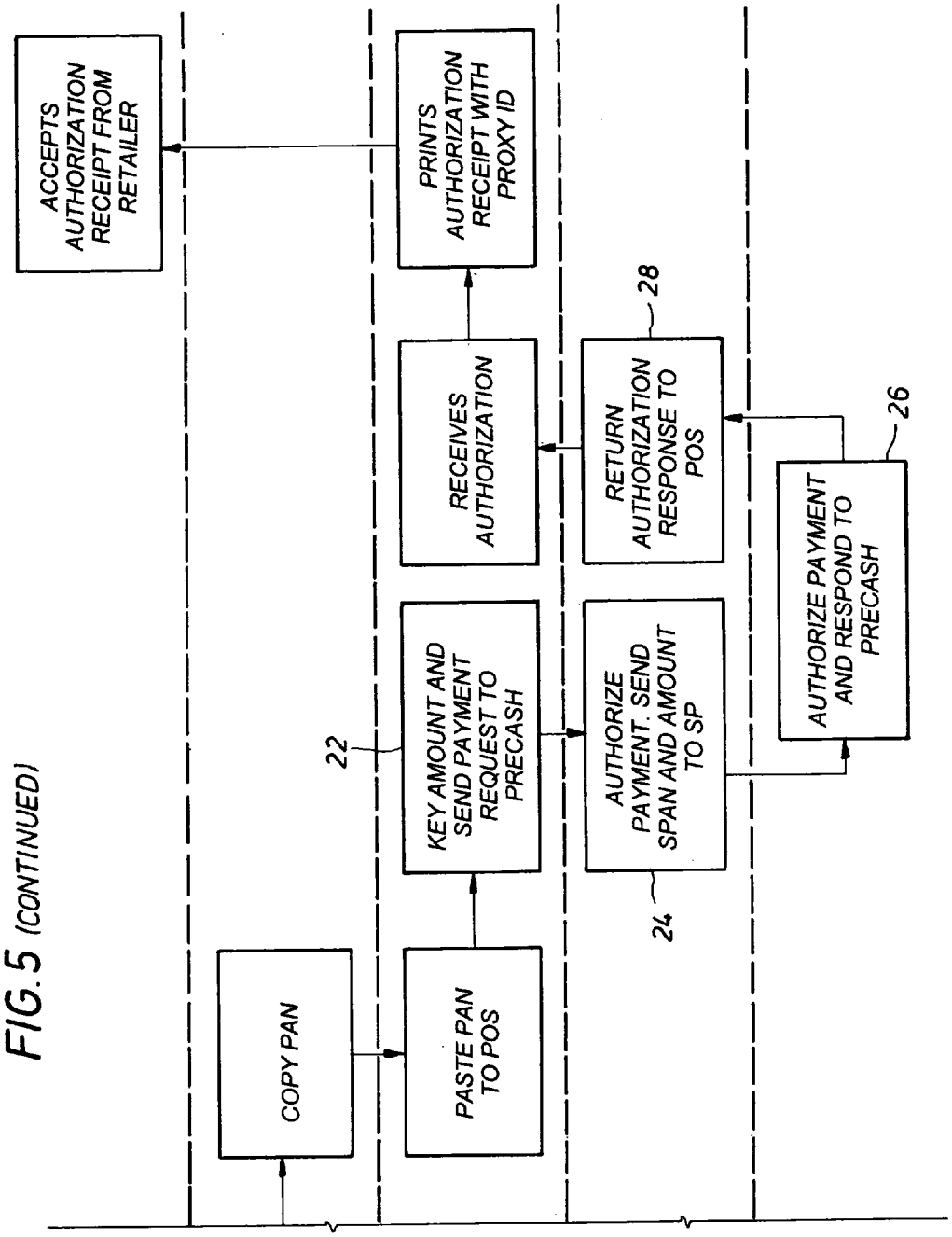
FIG. 5 is a flow diagram illustrating a new customer cardless process in accordance with one embodiment of the present invention.

Referring to FIG. 5, an illustrative new customer cardless process flow is shown. To simplify the description of the invention, the process flow is separated by rows that represent which party/system performs certain steps. For example, the first row illustrates steps performed by the consumer, the second row illustrates steps performed by the cardless interface system, the third row illustrates steps performed by a merchant, and so on. It should be appreciated, however, that FIG. 5 illustrates just one of many possible embodiments and that the process may be modified so that other parties/systems perform certain steps.

At block 10, a new consumer presents a payment to a merchant, kiosk, or other POS location. A proxy ID is entered and the new consumer information is captured, illustrated, for example, at blocks 12 and 14. At blocks 16, 18, and 20, an intermediate account number (e.g., PreCash account number, 'PAN') is issued and associated with a service provider account number 'SPAN'. At block 22, the merchant, in this example, keys in the amount of the payment and sends the information to the intermediate account system. At blocks 24, 26, and 28, the payment is authorized by the intermediate account system and the service provider system and an authorization response is returned to the POS, the merchant location in this example. An authorization receipt showing the proxy ID is printed and accepted by the consumer.

Figure 6:
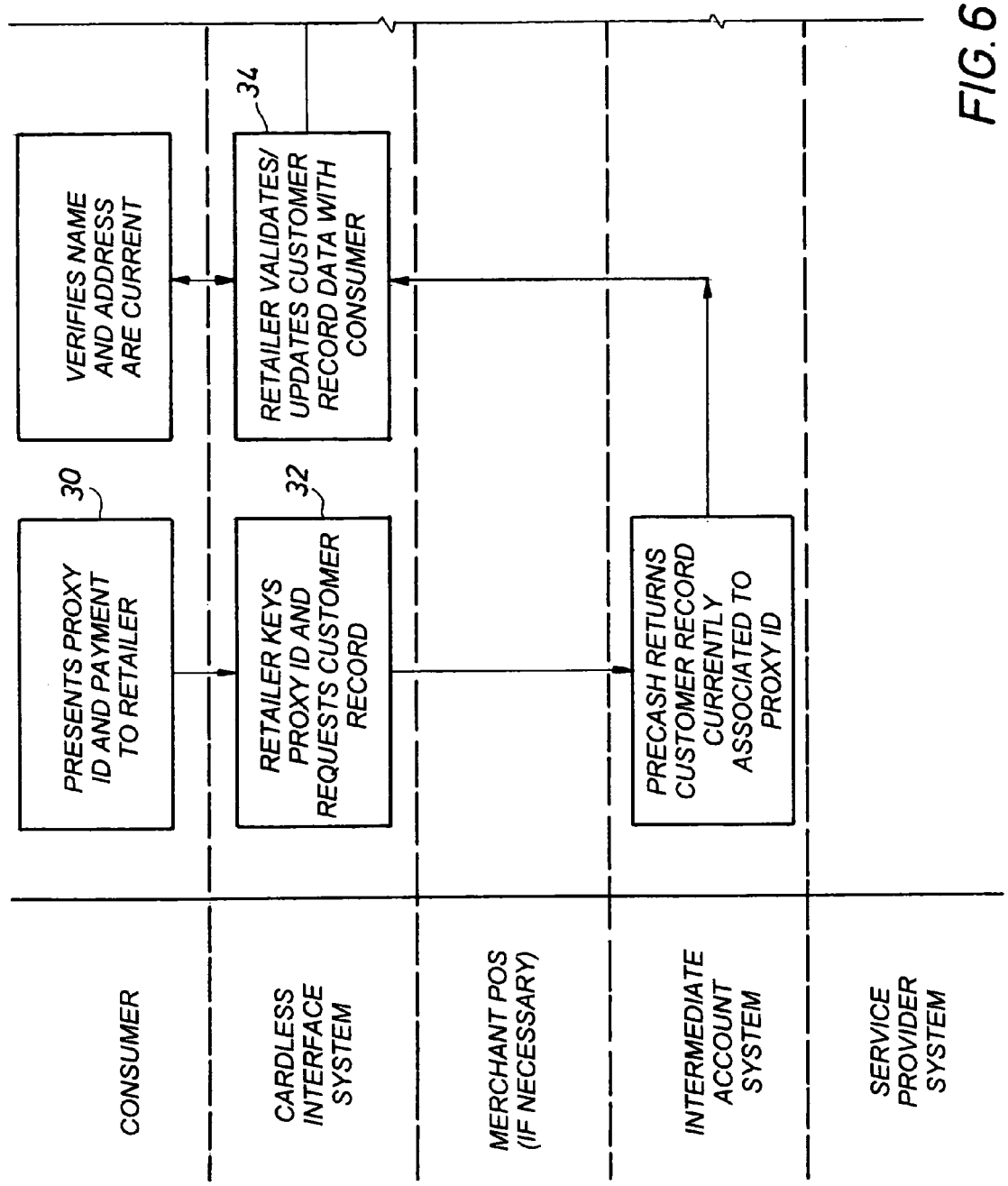
FIG. 6 is a flow diagram illustrating a subsequent cardless payment process in accordance with one embodiment of the present invention.
Figure 6:
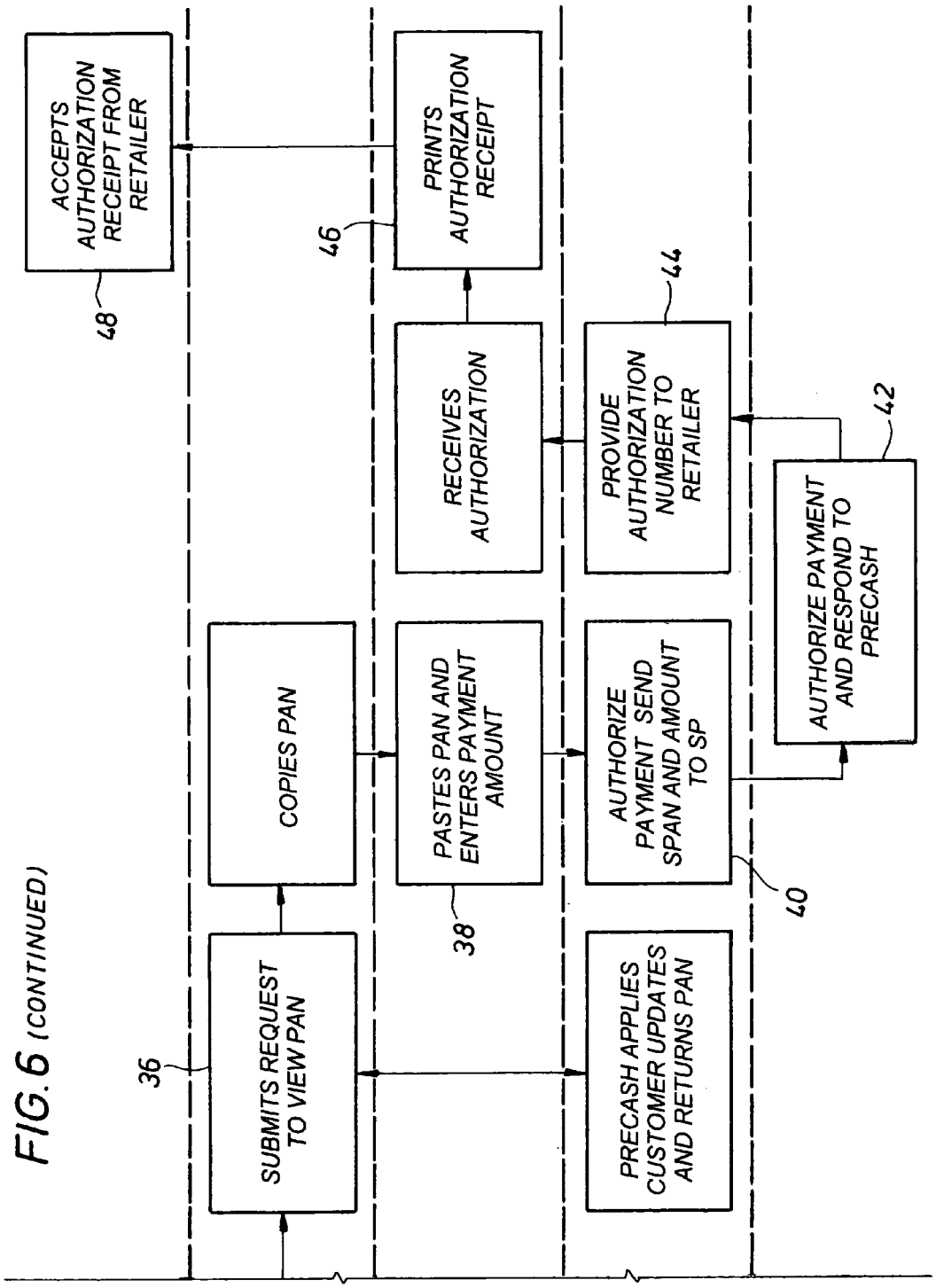

When the consumer wishes to enter into a second payment transaction, the same proxy ID may be used to facilitate the transaction. Referring to FIG. 6, an illustrative subsequent cardless payment process is shown. At blocks 31 and 32, the consumer presents the proxy ID and payment to a retailer. Using a cardless interface system (e.g., WebConnect), the retailer enters the proxy ID and forwards the information, in this example, to the intermediate account system. It should be appreciated that both the new customer cardless process, illustrated in FIG. 5, and the subsequent cardless payment process, illustrated in FIG. 6, may be used without an intermediate account. In this alternative embodiment, information may be sent directly to the service provider system.

At blocks 34 and 36, the retailer validates the customer information received from the intermediate account system and submits a request to view the intermediate account number (e.g., PreCash account number, 'PAN'). After receiving the intermediate account number, the merchant processes the number to complete the transaction. In this example, at block 38, the merchant electronically pastes the intermediate account number into a payment system (e.g. a POS terminal) and enters the payment amount received from the consumer. At blocks 40-44, the payment is authorized and processed by the intermediate account system and service provider system. An authorization number is provided to the retailer. At blocks 46 and 48, an authorization receipt is printed and accepted by the consumer.

It should be appreciated that both the new customer cardless process and the subsequent cardless payment processes allow a user to enter into payment transactions without the need to carry a payment card. In addition, if a consumer forgets or loses his proxy ID, any number of additional new customer cardless processes may be entered into.

Universal Card (Branded Prepaid Debit Card with PreCash Loading Number)

A universally accepted association branded (MasterCard, Visa, Discover, American Express, Star, Pulse, NYSE, and the like) prepaid debit card may be provided that functions similar to a typical debit card in how and where it can be used, but its value is prepaid by the consumer. Essentially a consumer can use a prepaid debit card as a replacement for a traditional bank account or for carrying around cash to make everyday payments.

With the present invention, the pre-paid debit card combines the functionality of a traditional prepaid debit card with the functionality of a traditional prepaid card that is operable with an intermediary account. This combination facilitates the self-loading of the bankcard, eliminating the need for the consumer to carry a second load-card, or the development or confusion of loading from the bankcard account number itself A prepaid load number may be placed on the card itself. In one embodiment, the prepaid load number is a 16 digit PreCash number operable with PreCash's prepaid system. The card number may be printed on the back of the card to facilitate manual entry if necessary. The card number may also be fixed to the card in a manner that permits it to be automatically read by the merchant's standard mag-stripe reader. For example, the card number may be encoded in Track 1 of the current mag-stripe. The merchant identifies the card number in this new location and distinguishes it from the debit card number using, for example, a unique BIN number range.

Another option is to include a dual mag-striped card with the debit card information carried in the traditional mag-stripe at the top of the backside of the card and the prepaid card stripe (e.g., the PreCash stripe) at the bottom of the backside of the card. The merchant simply turns the card over to read the prepaid load number.

It should be appreciated that other methods for reading the debit card information and the prepaid card identifier information may be used as well. For example, a bar code may be printed on the card and read using conventional techniques. Regardless of the method selected, the present invention allows the prepaid card to function as both a prepaid debit card, while simultaneously facilitating recharge transactions. Accordingly, the end-user only carries one card rather than two (i.e., the end-user is not required to carry an additional card for recharging the prepaid debit card).

In another embodiment, the prepaid debit card may be self-loading without the need for a separate accompanying mechanism. For example, in one embodiment, the prepaid debit card may be loaded using the debit card number. In other words, the debit card may be used as it ordinarily would for purchasing goods and/or services, but also to load value. When scanned, for example, by certain points-of-sale, the readers may be configured to route electronic payments to the consumer's account, thus recharging the account.

One to Many Payments from a Single PreCash Card (Including Universal Card)

With the intermediary account example described above, the payment card (i.e., the account number on the card) is usually only associated with a single end-user account maintained, for example, by a service provider or other retailer. This requires the end-user to carry a separate card for each end-user account. A better option is to provide the ability to associate an unlimited number of end-user accounts to a single intermediary account number or card.

In this case, merchants or end-users direct transactions to a specific service provider where multiple service provider associations have been made. In other words, during a load transaction (e.g., recharge transaction), for example, the particular end-user account desired to be loaded is identified so that the payment is directed to the appropriate destination. This payment direction can be done by the merchant, for example, by inputting at the time of the payment the service provider(s) and amount(s) that are to be paid. This direction of payment could be one single transaction or done with multiple transactions.

The association of multiple service providers and the direction of payments by the retail merchant require the input and transmission of one additional data element that will indicated the service provider. This identifier may be referred to as the SPID or Service Provider Identifier. The SPID may be used in conjunction with the intermediary account associations to direct a payment transaction to the desired destination. For example, AT&T may have an identifier '123'. If an AT&T payment is to be made, the intermediary account number (generally embossed on the payment card) would be provided along with the identifier '123'. This information would signal that the current payment is intended for the AT&T end-user account associated with the intermediary account.

In a similar manner, end-users may also direct payments after they leave the merchant via a web site, IVR (interactive voice recognition) or live agent support. This feature may work, for example, on a PreCash intermediary account number, including the PreCash number carried by the Universal Prepaid debit card, described above.

Virtual Cell-phone Stored Card Number

In this illustrative example, the end-user's cell-phone holds a virtual account number (e.g., end-user account, intermediary account, etc.). The virtual account number may be presented or recalled in a number of different ways. For example, the virtual account number may be displayed on the cell-phone's LCD, transmitted using a wireless signal, such as infrared, Bluetooth, Wi-Fi, radio frequency identification (RFID), etc.

In one illustrative embodiment, the virtual account number is displayed on the cell-phone's display in a standard bar code format. This allows the end-user to not have to carry a payment card, but allows the retailer to input the account number via a standard bar code reader, saving time and assuring data entry accuracy that current payment cards provide.

A small application may be loaded on the cell-phone that would hold and recall the account number. The consumer is then able to recall the account number at the time they wish to make a transaction. The application could be loaded by the service provider at the time of activation or later by the consumer.

Hybrid PreCash and Universal Card

The hybrid card includes the marketability of a private label card but also the functionality of an open systems card. The hybrid card may include a mag-stripe or some other mechanism that allows for value to be loaded. The mag-stripe may include information that is specific to an end-user account or an intermediary account that is associated with an end-user account. As described above, the end-user is able to load value or make a payment by visiting merchant points-of-sale.

In one embodiment, the front of the card is embossed with an active universally accepted card number, such as an account number from American Express, Discover, Visa, MasterCard, Star, Pulse, NYSE, etc.) The card does not include, however, an association brand on the front of the card. In other words, the card includes, for example, a MasterCard account number but not the MasterCard logo or brand. Instead, the card may be branded with a private label, such as the logo for the service provider the card is intended. In one example, the card may be branded with the Itunes logo from Apple. When branded as such, the card may be used to purchase music from the Itunes website.

The Hybrid card includes the ability to load prepaid value or make payments at identified merchants, but then used to make a card-not present purchase to any merchant who accepts the association branded card. For example, the end-user could use the card for online purchases (e.g., to purchase music from Itunes), telephone purchases, or for bill payment.

With the hybrid card, the service provider (e.g., Itunes) can implement payment card related functionality with their offered goods or services without making extensive changes to their billing or payment infrastructure. The card includes an active universally accepted card number (e.g., MasterCard) that works with their existing infrastructure. As opposed to traditional credit cards, the hybrid card appears to the end-user to only be operable with a particular service provider (e.g., Itunes) that is branded on the Card. In essence, the service provider gets the marketing advantage of a proprietary card but the functionality of an active universally accepted card.

In one embodiment, the active card number routes transactions over the open association network. The service provider is also paid via the open association network, therefore eliminating the need to integrate with the card issuer, such as PreCash, directly. The service provider may pay standard association interchange for the transaction.

In another illustrative embodiment, the universally accepted card number may be hidden from the end-user. In this example, the payment card may be used to post payments with a service provider (e.g., Itunes, AT&T, etc.) using the open system network unbeknownst to the consumer. For example, the consumer may be issued a payment card that includes an ordinary non-universally accepted card number. If an intermediary account is used, the intermediary account may be associated with an end-user account. The card still appears to the consumer to be a private label card (i.e., a card branded by a particular service provider, such as AT&T or a generic industry card such as a cell phone, or cable TV payment card). It should be appreciated, however, that use of intermediary account is an optional feature. That is, the consumer may present their card to a retailer as part of a payment process, and the information may be communicated to the service provider without the use of an intermediary account.

When the consumer uses the card, the non-universally accepted number is presented. Payments to the service provider, however, are carried out using a universally accepted number that permits open system transactions (i.e., the type of transactions the service provider is accustomed to processing). With this particular embodiment, the universally accepted card number is not made available to the consumer but is still used behind the scenes to facilitate payments with the service provider. As described above, the service provider can make their service available to payment card holders without making extensive changes to their existing billing or payment infrastructure.

In one embodiment, when a consumer makes a prepayment or post-payment using the card, the payment is funded to the service provider using a universally accepted number. To accomplish this, each payment card may be associated, behind the scenes, with a universally accepted open system number (e.g., MasterCard, Visa, Pulse, etc.). The payment may be received, for example, by an intermediary and then forwarded to the service provider using the universally accepted number. In another embodiment, multiple transactions from different card-holders may be batched, and then forwarded to the service provider using a single universally accepted number. In short, the service provider is able to receive payments from card-holders without having to make extensive changes to their infrastructure. This illustrative example, however, has the added advantage of hiding from the consumer the universally accepted number used with the transaction.

Many service providers are beginning to offer same day payment posting for its consumers who can pay by traditional credit or debit cards. In this embodiment, the cash-paying consumer will carry a prepaid or post-paid card embossed with an intermediary card number. The card is associated, behind the scenes, with a universally accepted open system number (e.g. MasterCard, Visa, Pulse, etc.). After the consumer makes the payment on the prepaid or post paid card, the intermediary receives the payment and associates the payment card number with the pre-assigned universally accepted open system number and the end-user account number. The intermediary or its agent then signs on to the service provider's payment web page, logs in as the consumer, enters the universally accepted open system number and payment amount. The service provider will post the payment as paid (usually same day), and the settlement of funds will be through the existing open system network. The intermediary will deliver back to the point-of-sale a confirmation of payment posting for the consumer. As part of this "on-line" payment from the points-of-sale, the intermediary or its agent could also provide a consumer balance due amount on the point of sale register.

Figure 7A:
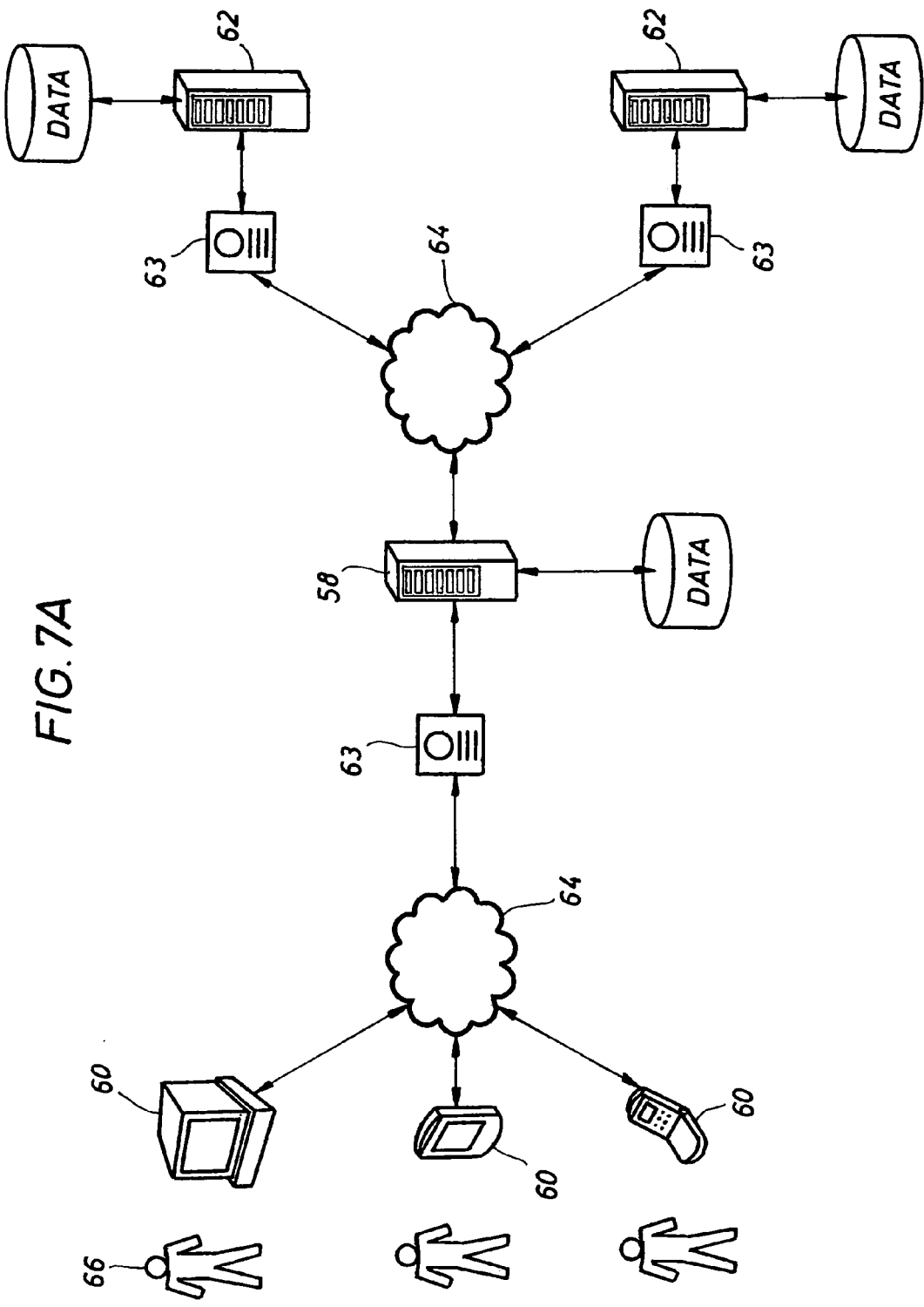
FIG. 7A is a component diagram of one embodiment of the present invention.
Figure 7B:
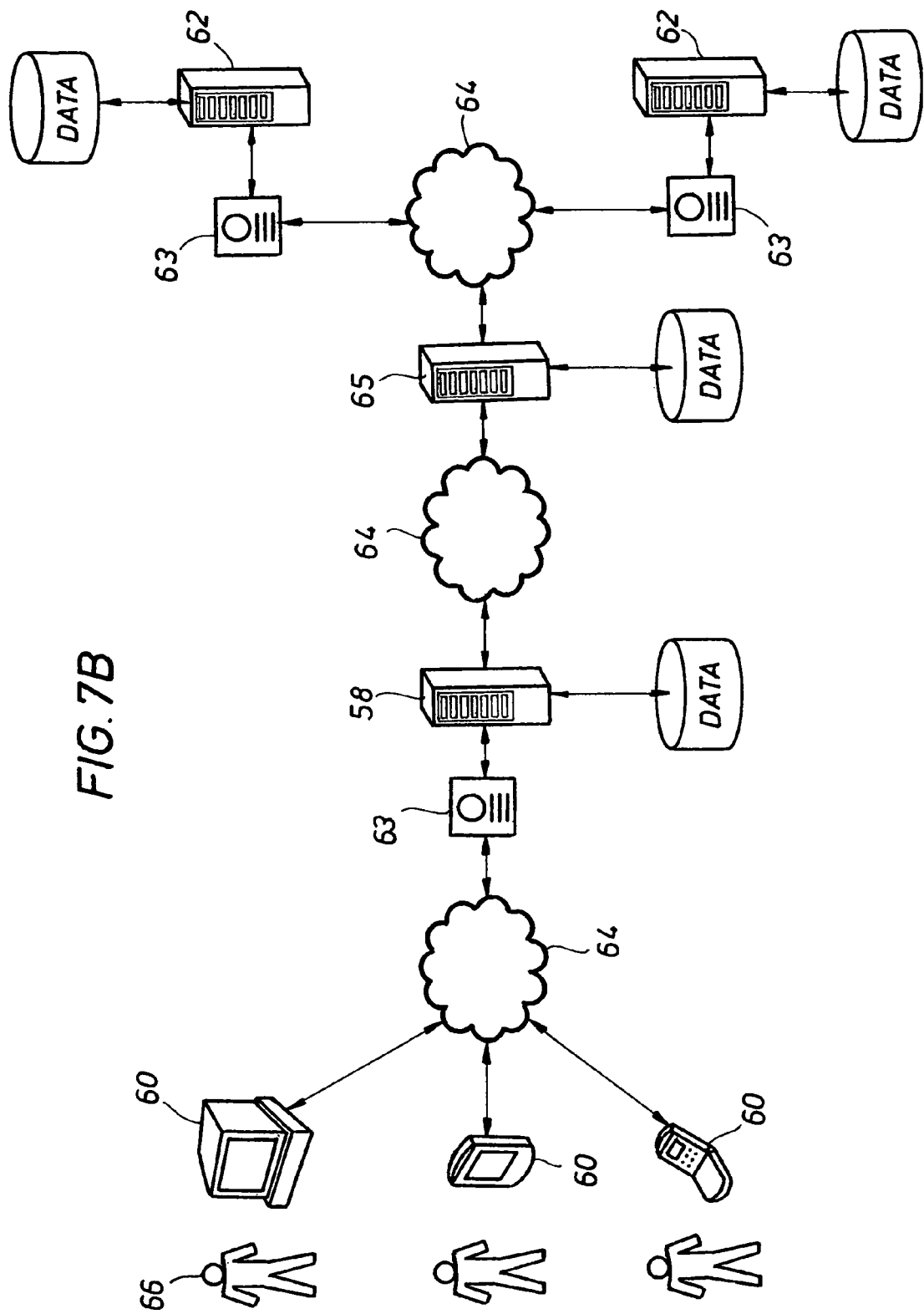
FIG. 7B is a component diagram of one embodiment of the present invention illustrating a third party consolidator computer system.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through . communication media, such as a local area network, a telephone network, or a public network like the Internet. It should be understood, therefore, that such media, when carrying computer readable instructions that direct the method functions of the present invention, represent alternate embodiments of the present invention.

Referring to FIGS. 7A-8, in one embodiment, the present invention provides a computer system and method capable of facilitating an electronic payment on behalf of an end-user to the end-user's account with a service provider through use of an Internet website. In one embodiment, the computer system of the intermediary of the present invention provides one or more computer systems (58) capable of operating in conjunction with one or more computer terminals (60) and service provider computer systems (62) via one or more computer networks (64) in order to provide the end-user (66) with a convenient and efficient manner of making payments.

In one embodiment, the end-user may sign up for the services provided by the intermediary through a bill-pay website (68). The end-user may sign up with the intermediary in a number of ways, such as through the Internet or through a merchant at a point of sale terminal or kiosk for payment services. To sign up, the end-user provides his or her name, address, email address, and other identifying information such as an address and phone number. The end-user may also create a password for the end-user's account with an Internet website so that the end-user may control access to the end-user's account with the intermediary. Once the end-user has signed up, he or she may be queried, using a graphic user interface, to utilize any number of services provided by the present invention.

The intermediary computer system of the present invention is capable of receiving payment request(s) via a computer network (64) from a terminal (60) operated by the end-user or from a remote computer system (60) in communicating with one or more Internet websites (68) operable with the system. An end-user may direct such payments through the use of a terminal (60), which may be a terminal at a point of sale location, a personal computer, or any other web-enabled device including, but not limited to, a cell phone, a personal digital assistant (PDA), or other suitable electronic device.

Such devices may be installed at the merchant location for use by an end-user or in the possession or control of the end-user, such as a personal computer that is located at the home of the end-user. In each case, the computer or device (60) through which the end-user transmits payment requests may be connected to the Internet, or other computer network, so as to access one or more Internet websites operable with the present invention.

In one embodiment, payment requests entered into a terminal by the end-user (66) provide the system with information such as the end-user's account number with a service provider, the amount of the requested payment, and an approval or authorization for payment(s) to be made on the end-user's behalf. In one embodiment, the payment request may also include an identification of the end-user's source of funds to be used to cover one or more payments as well as instructions regarding where and when to make such payments. The end-user may also enter notification preferences as part of his or her payment request, as described in greater detail below.

The Internet website operable with the computer system of the intermediary conveniently facilitates the transfer of value between 1) the end-user and the intermediary and 2) between the intermediary and the service provider. Value may be transferred in any number of ways. For example, value may be transferred from the end-user to the intermediary (in order to cover the amount to be paid to the service provider by the intermediary) through cash disbursement, wire transfer, or through electronic funds transfer, e.g., the use of a debit batch file that is submitted to the automated clearing house (ACH) for processing and ultimately debiting the bank account of the end-user and crediting to the account of the intermediary.

For example, if the intermediary has a merchant location, then value may be transferred to the intermediary by the payment of cash, such as the payment of cash at the merchant location and the association of the value of the cash with the end-user through the use of a terminal, personal computer, or any other web-connected electronic device installed at the merchant location to connect to the web-site. The end-user may also subsequently direct payments through IVR (interactive voice recognition) or live agent. Value may also be transferred to the intermediary using an existing financial network to communicate financial transaction data, as more fully described in the afore-mentioned U.S. Pat. No. 6,185,545, incorporated by reference herein.

Once a payment request is received by the computer system of the intermediary of the present invention, and value has been transferred from the end-user to the intermediary to cover the requested payment, the system transmits a universally accepted open system number and the payment amount indicated from the end user to the computer system of the service provider to effect payment on the end-user's account with the service provider. The present invention provides a number of ways to accomplish this task on behalf of the end-user.

In one embodiment, the computer system signs on to the service provider's payment web page (63), logs in on behalf of the end-user, and enters the universally accepted open system number and the payment amount received from the end-user to effect payment on the end-user's account to the service provider. In one embodiment, the universally accepted open system number is a universally accepted credit card number or other means of payment owned by an intermediary associated with the computer system of the present invention. The term "service provider" should be understood to mean service provider and other retailers.

The payment using the universally accepted open system number may be facilitated "behind the scenes" in a manner unknown to the end-user. Further, after the payment is made, the end-user may receive a notification of the payment. Such notification may be provided to the end-user via electronic correspondence, telephone, or otherwise as directed by the end-user in his or her payment request. In one embodiment, the end-user may enter notification preferences along with the payment request in order to specify the type of notification he or she desires.

In one embodiment, the intermediary computer system may communicate with the service provider system using interactive voice recognition (IVR), direct transmission to the host computer of the service provider, and/or through a designated third party consolidator or aggregator of payments.

In one embodiment, the computer system of the intermediary provides programming for accomplishing IVR communications with the computer system of the service provider, direct communications with the computer system of the service provider, i.e., through a virtual private network, modem, or the Internet, and/or through the computer system of a third party consolidator or aggregator (65) who would facilitate payment to the service provider on behalf of the intermediary.

Thus, instead of logging on to the webpage of the service provider, the computer system of the intermediary may use interactive voice recognition (IVR) to communicate with the computer system of the service provider to convey the universally accepted open system number and the payment amount received from the end user to effect payment on the end-user's account to the service provider. Further, instead of logging on to the webpage of the service provider, the computer system of the intermediary using a direct connection to the computer system of the service provider to convey the universally accepted open system number and the payment amount received from the end user to effect payment on the end-user's account to the service provider.

In another embodiment, instead of logging on to the webpage of the service provider, the computer system of the intermediary may communicate with the computer system of a third party consolidator to convey the universally accepted open system number and the payment amount received from the end user to effect payment on the end-user's account to the service provider by communicating such information to the third party consolidator. The computer system of the third party consolidator would then consolidate numerous payments to be made to the service provider, and subsequently communicate the universally accepted open system number and the payment amount received from the end user to effect payment on the end-user's account to the service provider.

Referring to FIG. 8, the end-user accesses an Internet website operable with a computer system of the intermediary through a URL address and logs on to the website, as illustrated by Box (70). Once logged into the system, the end-user may enter one or more payment requests, as illustrated by Box (72). As described above, the payment request may include information such as the end-user's account number with one or more service providers, payment amount, time of payment, payment authorization, and/or notification preferences.

After receiving a payment request, the computer system of the intermediary transfers value from the end-user's funds to an account held by the intermediary, as illustrated by Box (74). Such transfer may be made according to any number of methods, as described in greater detail above. The intermediary then initiates communication with the service provider(s) listed by the end-user in his or her payment request, as illustrated by Box (76). Communication with the service provider(s) may be initiated according to any number of methods, as described in greater detail above. Regardless of the manner of communication between the intermediary and the service provider(s), a universally accepted open system number associated with the intermediary may be provided to the service provider(s) in order to effect payment of the amount specified by the user, as illustrated by Box (78).

The end-user may accomplish a one-to-many payment approach as discussed above using one or more Internet websites. In other words, when transferring value the particular service provider to be paid is identified so that the payment is directed to the appropriate destination. This payment direction can be done by the end-user by inputting at the time of the payment the service provider(s) (which would include retailer(s)) and amount(s) that are to be paid. This direction of payment could be one single transaction or multiple transactions.

The association of multiple service providers and the direction of payments by the end-user requires the input and transmission of one additional data element that will indicated the service provider. This identifier may be referred to as the SPID or Service Provider Identifier. In one embodiment, the SPID may be used in conjunction with the intermediary account associations to direct a payment transaction to the desired destination. For example, AT&T may have an identifier '123'. If an AT&T payment is to be made, the intermediary account number (generally embossed on the payment card) would be provided along with the identifier '123'. This information would signal that the current payment is intended for the AT&T end-user account associated with the intermediary account. The time of the payment to be made to the service provider is also an option for the end-user. By timing the transfer of value to the intermediary and then the payment to the service provider, the end-user can optimize the timing of such payments and withdrawal from the end-user's bank account so as to maximize the interest earned by the end-user on funds in a bank account and to ensure that payment was made before the due date of such payment.

In one embodiment, payments by the intermediary to a single service provider may be carried out once per day in a batch mode, thereby paying each service provider on behalf of a number of end-users in a single batch program. Thus, multiple transactions from different end-users may be batched, and then forwarded to the service provider using a single universally accepted number. In short, the service provider is able to receive payments from card-holders without having to make extensive changes to their infrastructure. This illustrative example, however, has the added advantage of hiding from the consumer the universally accepted number used with the transaction.

Expedited Payment Routing for Thousands of Payments for Hundreds of Payors with Dozens of Payees in a Day One set of particularly preferred embodiments provides a process for facilitating payment transactions in which a third-party payment router (E.g. PreCash, FIG. 9) transacts at least thousands of expedited (generally same day) payments for at least hundreds of payors with at least dozens of payees, using at least one open system card association network. Typically, the payment router will be a facilitator, a third-party, unrelated to the hundreds of payors and unrelated to the dozens of payees.

Key players in this set of preferred embodiments, in addition to the payment router, include 1) an issuing or sponsoring bank, frequently referred to simply as the issuing bank, see FIG. 9, which could, of course, be the same entity as the payment router; and 2) the issuing bank's processor, which could be part of the issuing/sponsoring bank or could be outsourced or could be an issuing bank's agent or contractor. (In FIG. 9 the issuing bank's processor is not shown separate from the issuing bank.)

The issuing bank will typically have a relationship with the payment router and secure a capacity to issue a block of universally accepted open system card numbers (UAOSCN,) typically under an identified "program" (see FIG. 9) of a Card Association or Network. In particular, the issuing bank will secure the authority for sponsoring and/or issuing at least thousands of active UAOSCN in one day, directly or indirectly, "to" a third-party payment router. This payment router will be the "owner" of the active numbers in the issuing bank system. That is, the payment router will have "the right to use" the UAOSCN. (The issuing bank, in fact, typically authorizes processors (in house or outsourced) to perform tasks such as actually create the active numbers, load accounts associated with the numbers, and/or issue out the numbers.)

Figure 10A:
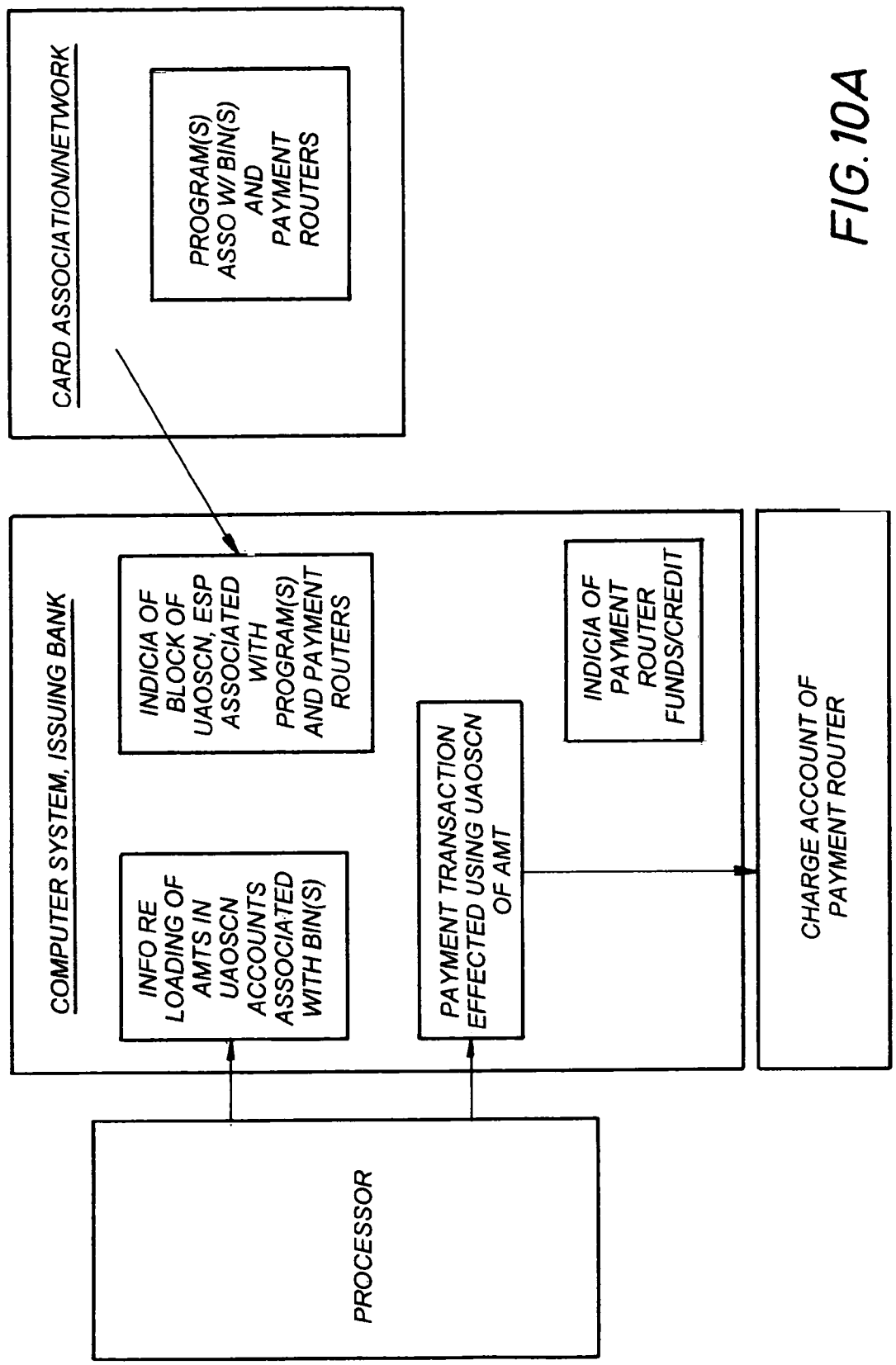
Figure 10B:
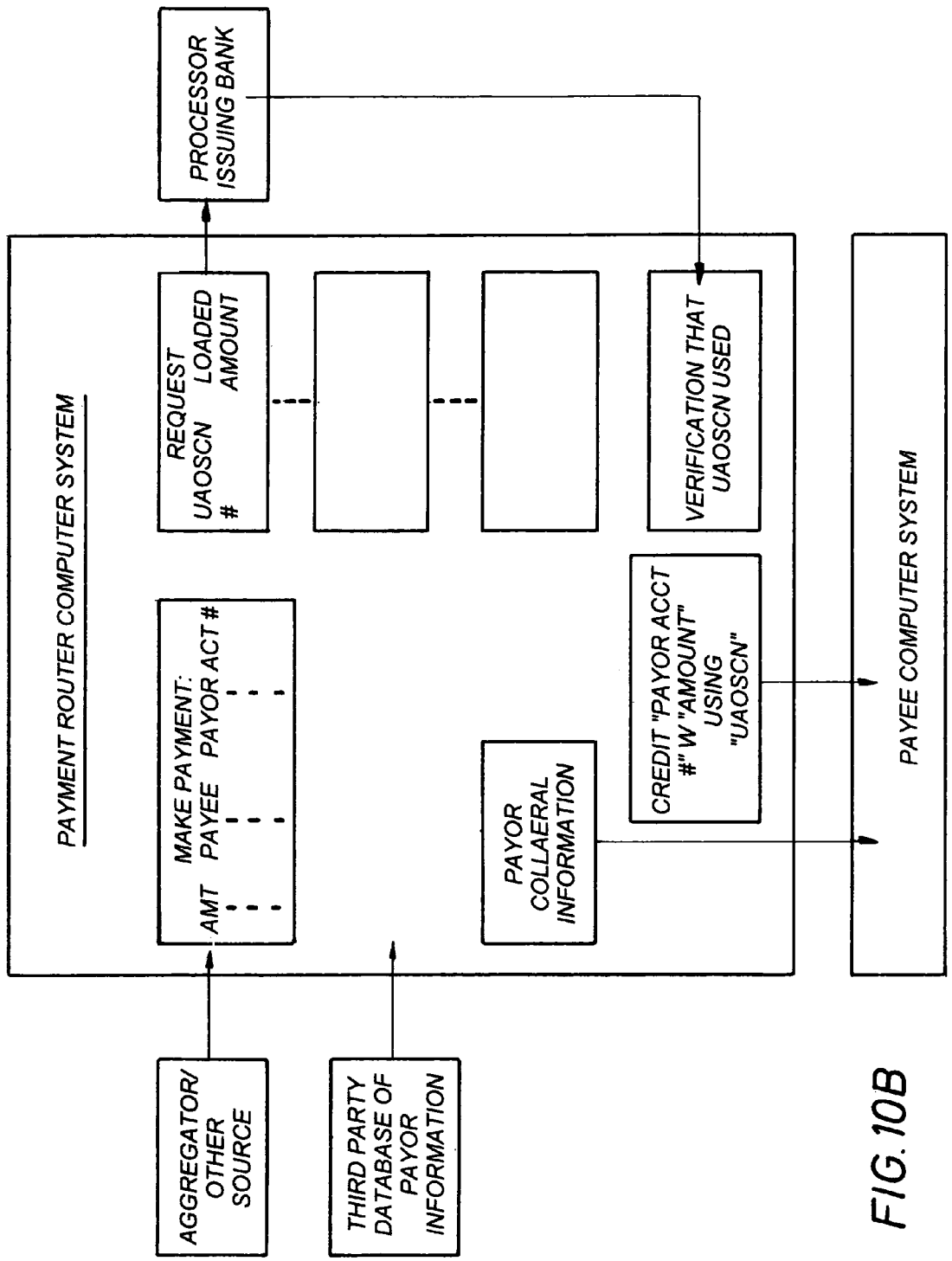

The issuing bank, processor and payment router typically manage their affairs using computer systems, as illustrated in the embodiments of FIGS. 10A-10C.

The issuing bank, in the preferred embodiments, agrees to fund at least thousands of payment transactions in one day, through at least one open system card association network, for at least thousands of UAOSCN owned by a payment router, and typically involving millions of dollars a day. This process facilitates accomplishing expedited payment transactions for at least hundreds of payors with at least dozens of payees. (Typically the process also includes maintaining, directly or indirectly, at least an indicia of at least a concomitant millions of dollars of funds and/or credit for or on behalf of the payment router with the issuing bank to stand, directly or indirectly, behind the issuing banks' fundings.)

The thousands of UAOSCNs may be associated with one BIN or with a plurality of BINs, depending, among other factors, upon which strategy works best with the payees.

In preferred embodiments the issuing and funding process involves a request by a payment router for thousands of active UAOSCN to be issued to it, typically each day, each "preloaded" (with funds and/or credit,) preferably of a specified amount, and involves relevant information, including the UAOSCN, to be conveyed to the payment router. Amounts specified preferably correlate with imminent payments to be made. (Again, the payment router will maintain sufficient funds and/or credit with the issuing bank, directly or indirectly, to stand behind requests for UAOSCN, that the router owns, loaded with amounts.)

Subsequently, the open system association network, as instigated by the payment router and the payee, effects a process whereby amounts loaded in/on the UAOSCN, directly or indirectly, are used (possibly first to authorize and) to make payments, as instructed by the payment router and the payee, which process preferably includes on behalf of a variety of third-party payors (and with a variety of third-party payees.) Subsequently, the funding typically includes, using the open system association network, crediting an appropriate account for or on behalf of a payee (such as at a payee's acquiring bank) with an appropriate amount and depleting a corresponding or appropriate amount from the account associated with the UAOSCN used to make the payment. (Again, the issuing bank "funds" the UAOSCN account but the payment router stands behind such funding.)

Primary advantages of this set of preferred embodiments for commercial scale payment routing processes are 1) the ability to effect expedited (largely same day) payment without the cost and trouble of establishing a closed system integration of a payment router or facilitator with a biller or payee; and 2) the capacity to effect payment transactions largely without need to significantly charge the payor for the payment process.

(Same day payment means the payment is effected in most cases on the same day. A "third-party" payment router or facilitator indicates a party distinct from, and generally unrelated to, a biller/payee and a payor. UAOSCN refers to a universally accepted open system card number, which could be debit, credit, any of the myriad of hybrid type card numbers, the number associated, directly or indirectly, with an account. The terms payment facilitator and payment router are at times used interchangeably. A computer system of an issuing bank or payment router or processor is typically a computer system owned by the issuing bank, etc., but of course portions or all of the computer system could be outsourced.)

A novelty of the instant large commercial-scale payment routing embodiments lies in one payment router "owning" thousands of UAOSCN, in fact, thousands a day, which the router can use to make payments on behalf of third party payors and wherein the payment is expedited or largely same day and is made without the necessity of establishing a closed system integration of the payment facilitator with billers or payees, and further, wherein the payment system can be significantly recompensed with Association interchange.

In one aspect of the instant commercial payment routing embodiments, third-party aggregators or consolidators (aggregators) compile thousands of bill pay transactions a day, transactions to be performed, and contact a payment router therewith. Typically, an aggregator collects information from banks and other sources who provide a service of paying bills for their customers and clientele. One aggregator may have a list of thousands of bill pay transactions to be effected for a given day, at dozens of service providers or billers. Two or three large aggregators might aggregate bill pay transactions all across the country. (However, of course, the instant commercial payment routing system is also useful for making payments for a wide variety of different commercial entities.)

In the instant preferred payment router embodiments, a bank, usually referred to as an issuing or sponsoring bank, and typically a Member of a Card Association(s), applies for at least thousands of universally accepted open system card numbers (UAOSCN) from at least one Association Network associated with a specific "program" (see FIG. 9) recognized by the Association Network. (The number of UAOSCN could well be in the millions or larger.) These UAOSCN numbers, at least today, are typically 15 or 16 digit numbers wherein certain numbers (such as the first 5 or 6) comprise a BIN, or bank identification number. (The BIN may become essentially an identifier of a payment router or who will "own" the numbers.) Either a single BIN or a plurality of BINs may be secured, depending, for instance, on the number of Networks anticipated to be dealt with and on details of payee systems.

To implement preferred embodiments of the instant invention, the bank preferably becomes licensed/authorized/approved by one or more Open Loop Card Networks/Associations as an issuer/sponsor of UAOSCN. The bank applies to the Network/Association to become an issuer/sponsor typically under an identified "program." An exemplary short definition of a "program" is attached as FIG. 9. Programs are defined and set up by Networks/Associations and, importantly, correlate to interchange rates in accordance with the definition of the program. A Network/Association will approve BIN(s) or bank identification number(s), the BIN typically being correlated with or tied to a relevant program.

In the preferred system the bank utilizes a processor. (The processor could be a part of the bank, or not, and in fact the payment router, the issuing bank and the processor could all be part of the same entity.) The processor facilitates the process of issuing and/or funding payment transactions by and for the issuing bank. (Merchants and/or their acquiring banks may also utilize a processor. Their processor, in practice, may be different from the processor utilized by the issuing bank.)

Typically UAOSCNs have an identifying BIN number and an identifying card number, both. A payment router might request and receive UAOSCNs having the same BIN or different BIN numbers.

One value of a variety of BIN numbers is to avoid appearances of impropriety in the computer systems of payees.

To summarize, the issuing bank typically uses a processor, either in house or outsourced. Typically also the issuing bank will enter into an agreement with a payment router or facilitator. Also, the issuing bank system is largely automated and implemented on computer systems, as is that of the processor and the payment router. (Of course, routers or facilitators could be one and the same as issuing banks, and for that matter, as the processor also, although such is not customary today in the industry.) According to exemplary processes of the instant embodiments, an aggregator or the like contacts a payment router or facilitator with hundreds, or thousands or more, of payments to be made, typically in a given day. Frequently it is for the same day. The payment instruction may typically contain, at least directly or indirectly, indicators of the amount to be paid, the payee and likely an account number of a payor at the payee. There could also be indicators of the payor itself. In fact, the payment information may contain other identifying information of or about the payor.

(The payment router or facilitator may also have established its own database to supply relevant information in regard to payors or payor account numbers, sometimes referred to as collateral information. Alternately the router or facilitator could outsource requests for further ancillary payor or account information to third-party databases.)

Preferably, for each payment transaction to be effected, the router requests a UAOSCN to be activated and issued to it by the issuing bank (and/or its processor) with whom the router has an arrangement. The UAOSCN will be owned by the router. (The router typically retains funds and/or credit with the issuing bank to cover its transactions.) For each UAOSCN activated, the processor of the issuing bank is usually the entity that creates (by algorithms typically) a portion of, such as the last ten digits or the like, of the UAOSCN. Algorithms typically exist for generating these digits, which algorithms periodically change.

The UAOSCN can operate in several ways. In one preferred environment, the router requests the processor of the issuing bank to load funds into the account of the UAOSCN, the amount typically being the amount required to process the payment transaction to be effected: i.e. the UAOSCN account is "preloaded." Alternately, the issuing bank could extend credit to and/or load credit on the UAOSCN account. (Alternately again, the UAOSCN could function as a proxy number and point to, or refer to, a further account, such as another account of the router or issuing bank. Alternately, a combination of the above approaches could be used.)

The router, using means described above, preferably contacts a payee or biller and presents a UAOSCN (owned by the router) for the purpose of crediting a payor account. In preferred embodiments, upon the completion of each transaction, the funds of the UAOSCN account are depleted by the processor or issuing bank and the UAOSCN and its account is typically not loaded or used again, but rather maintained depleted. Such offers a fraud prevention safeguard.

As above, in preferred embodiments, a processor of the issuing bank typically plays a role in the crediting and/or activating of UAOSCN and in executing the loading of amounts upon request by a router, and in depleting an account upon a payment transaction. Preferably also, the processor returns a verification in real time to the router, verifying in particular that a payment transaction was actually effected in regard to the UAOSCN account and the amount.

As is known in the industry, the issuing/sponsoring bank collects interchange in relation to each transaction involving its issued UAOSCNs, typically in accordance with the "program." The router can negotiate to be paid part or all of the interchange the issuing bank collects, for the service of creating the revenue for the issuing bank. In such manner the aggregator or payors need not be significantly charged for, or need not bear significant costs of, the payment operation.

Such preferred embodiments may handle several million dollars worth of, and tens of thousands of, payment transactions per day. The payment is expedited, that is, generally same day for the payor, and can be without the payor having to be charged a significant fee.

The use of a UAOSCN, where no card or plastic is created, has sometimes been referred to as a "virtual number program." As mentioned above, virtual number accounts can be preloaded or preauthorized with a specific amount or the virtual numbers can be used as a proxy to point through to another account.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A process of facilitating payment transactions in which a third-party payment router transacts at least thousands of payments for at least hundreds of payors with at least dozens of payees, using at least one open system card association network, the process comprising:

by an issuing bank, directly or indirectly,
sponsoring and authorizing the issuance of a plurality of universally accepted open system card numbers (UAOSCN) associated with a BIN, a program and a payment router;
tracking, by the issuing bank, the authorized issuance, directly or indirectly, of at least thousands of the UAOSCN issued in one day to the payment router as owner, each UAOSCN loaded with a router requested amount, in funds and/or credit; and
funding at least thousands of payment transactions in one day, automatically through at least one open system card association network, for at least thousands of the UAOSCN presented by the router.

2. The process of claim 1 including sponsoring and authorizing the issuance of a plurality of UAOSCN associated with a plurality of BINs.

3. The process of claim 1 including maintaining indicia of payment router funds and/or credit standing behind the loaded UAOSCN.

4. The process of claim 1 including tracking by a computer system of the issuing bank.

* * * * *